United States Patent
Zhu et al.

(10) Patent No.: US 10,700,347 B2
(45) Date of Patent: Jun. 30, 2020

(54) LITHIUM-ION BATTERY ANODES AND LITHIUM-ION BATTERIES USING THE SAME

(71) Applicants: Tsinghua University, Beijing (CN); HON HAI PRECISION INDUSTRY CO., LTD., New Taipei (TW)

(72) Inventors: Kun-Lei Zhu, Beijing (CN); Kai Liu, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 1 day.

(21) Appl. No.: 15/891,442

(22) Filed: Feb. 8, 2018

(65) Prior Publication Data

US 2018/0309117 A1 Oct. 25, 2018

(30) Foreign Application Priority Data

Apr. 24, 2017 (CN) .......................... 2017 1 0271843

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/483* (2013.01); *H01M 4/587* (2013.01); *H01M 4/625* (2013.01); *H01M 10/0525* (2013.01); *H01M 2004/027* (2013.01); *H01M 2004/028* (2013.01)

(58) Field of Classification Search
CPC ..................................................... H01M 4/366
See application file for complete search history.

(56) References Cited

U.S. PATENT DOCUMENTS

2002/0039684 A1\* 4/2002 Matsubara ............ H01M 4/133
429/231.4
2004/0105807 A1 6/2004 Fan et al.
(Continued)

FOREIGN PATENT DOCUMENTS

| CN | 1290763 C | 12/2006 |
|---|---|---|
| CN | 102971891 A | 3/2013 |
| CN | 101365830 B | 6/2013 |

OTHER PUBLICATIONS

Define-Film (Year: 2019).\*
(Continued)

*Primary Examiner* — Brian R Ohara
(74) *Attorney, Agent, or Firm* — ScienBiziP, P.C.

(57) ABSTRACT

The present disclosure relates to a lithium-ion battery anode comprising a flexible and free-standing carbon nanotube film, and a plurality of titanium dioxide nanoparticles uniformly adsorbed on a surface of each of the plurality of carbon nanotubes. The flexible and free-standing carbon nanotube film comprises a plurality of carbon nanotubes. A particle size of each of the plurality of titanium dioxide nanoparticles is less than or equal to 30 nanometers. The present disclosure also relates to a lithium-ion battery comprising the lithium-ion battery anode.

11 Claims, 14 Drawing Sheets

(51) Int. Cl.
  *H01M 4/48*      (2010.01)
  *H01M 4/587*     (2010.01)
  *H01M 4/62*      (2006.01)
  *H01M 10/0525*   (2010.01)
  *H01M 4/02*      (2006.01)

(56) References Cited

U.S. PATENT DOCUMENTS

| | | | |
|---|---|---|---|
| 2007/0092431 A1 | 4/2007 | Resasco et al. | |
| 2008/0107963 A1* | 5/2008 | Lee ................... | H01M 2/0275 |
| | | | 429/174 |
| 2013/0037758 A1 | 2/2013 | Kim et al. | |
| 2013/0106026 A1* | 5/2013 | Wang ................... | H01M 4/13 |
| | | | 264/442 |
| 2013/0108927 A1* | 5/2013 | Wang ................... | H01M 4/625 |
| | | | 429/231.1 |
| 2014/0057178 A1* | 2/2014 | He ................... | H01M 4/663 |
| | | | 429/221 |

OTHER PUBLICATIONS

Yu-de Chen, Single-walled carbon nanotubes modified by pyrene butyric acid for breast canser sensors, Master Thesis, Graduate Institute of Nanomaterials, College of Engineering, Chinese Culture University, 2013.6.

Sedigheh Abbasi et al., Decorating and Filling of Multi-Walled Carbon Nanotubes with Tio2 Nanoparticles via Wet Chemical Method; Engineering, 2013, 207-212, 5.

Zhenhai Wen et al., CNT@TiO2 nanohybrids for high-performance anode of lithium-ion batteries, Nanoscale Res Lett., 2013, 499, 8(1).

\* cited by examiner

LITHIUM-ION BATTERY ANODES AND LITHIUM-ION BATTERIES USING THE SAME

CROSS-REFERENCE TO RELATED APPLICATIONS

This application claims all benefits accruing under 35 U.S.C. § 119 from China Patent Application No. 201710271843.9, filed on Apr. 24, 2017, in the China Intellectual Property Office, the contents of which are hereby incorporated by reference. The application is also related to copending applications entitled, "METHOD FOR MAKING LITHIUM-ION BATTERY ANODES", filed Feb. 8, 2018 Ser. No. 15/891,451.

FIELD

The present disclosure relates to lithium-ion battery anodes and flexible lithium-ion batteries.

BACKGROUND

Carbon nanotube are a novel carbonous/carbonaceous material formed by one layer or more layers of graphite. A distance between two layers of graphite in the carbon nanotube is about 0.34 nanometers, which is greater than the distance between two layers in natural graphite. Thus, carbon nanotube is a suitable material for using as the anode of the lithium battery.

However, an energy density of conventional carbon nanotube anode is small, and conventional carbon nanotube anodes exhibit a large lattice change and a small operating voltage during a process of lithium insertion/extraction. Therefore, conventional carbon nanotube anodes can not avoid a collapse of electrodes and suppress a formation of solid electrolyte interface (SEI) layers, and lithium dendrites will appear in conventional carbon nanotube anodes.

BRIEF DESCRIPTION OF THE DRAWINGS

Implementations of the present technology will now be described, by way of example only, with reference to the attached figures, wherein.

DETAILED DESCRIPTION

Figure 1:
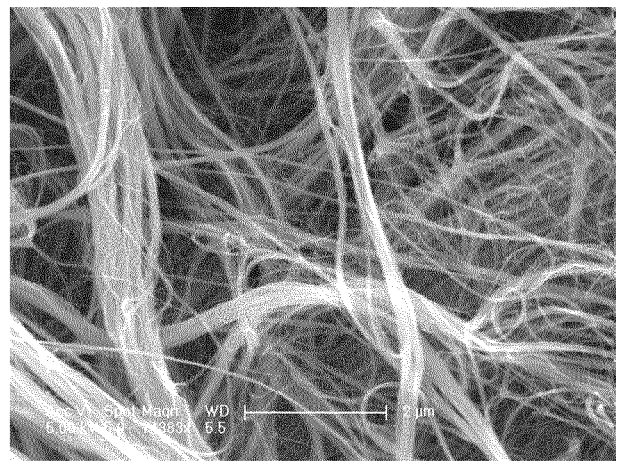
FIG. 1 is a scanning electron microscope image of one embodiment of a lithium-ion battery anode.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

Figure 2:
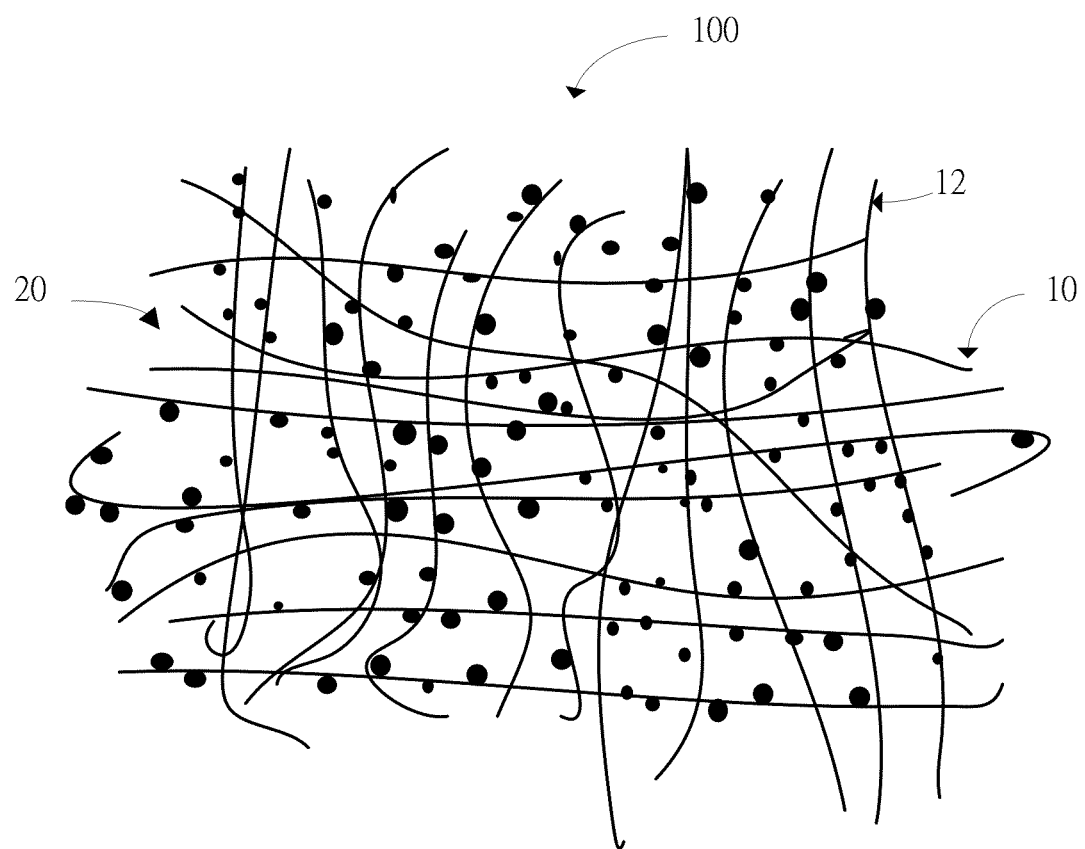
FIG. 2 is a structure schematic view of one embodiment of a lithium-ion battery anode.

Referring to FIG. 1 and FIG. 2, one embodiment is described in relation to a lithium-ion battery anode 100. The lithium-ion battery anode 100 comprises a carbon nanotube film 10 and a plurality of titanium dioxide ($TiO_2$) nanoparticles 20. In one embodiment, the lithium-ion battery anode 100 consists of the carbon nanotube film 10 and the plurality of titanium dioxide nanoparticles 20. The carbon nanotube film 10 is a flexible and free-standing carbon nanotube film. The carbon nanotube film 10 comprises a plurality of carbon nanotubes 12 uniformly distributed in the carbon nanotube film 10. The plurality of titanium dioxide nanoparticles 20 are uniformly adsorbed on the surfaces of the plurality of carbon nanotubes 12. A particle size of each of the plurality of titanium dioxide nanoparticles 20 is less than or equal to thirty nanometers. The lithium-ion battery anode 100 has flexibility and free-standing property, thus, the lithium-ion battery anode 100 can be bent freely.

In one embodiment, the particle size of each of the plurality of titanium dioxide nanoparticles 20 is in a range from about 3 nanometers to about 20 nanometers. In another embodiment, the particle size of each of the plurality of titanium dioxide nanoparticles 20 is in a range from about 3 nanometers to about 10 nanometers. When the particle size of each of the plurality of titanium dioxide nanoparticles 20 is in such ranges, the plurality of titanium dioxide nanoparticles 20 has large contact areas with electrolyte and $Li^+$ ions, and offers more lithium storage sites; thus, when the particle size of each of the plurality of titanium dioxide nanoparticles 20 is in such ranges, the lithium-ion battery anode 100 has high capacities even at very high charge/discharge rates.

The carbon nanotube film 10 is a flexible and free-standing carbon nanotube film. "Free-standing" means that the carbon nanotube film 10 can maintain a film structure, and not change even if part of the carbon nanotube film 10 is located on a support. For example, if the carbon nanotube film 10 is placed on a frame or two separate supports, part of the carbon nanotube film 10 not in contact with the frame or two separate supporting elements would be self-suspended between parts of the frame or between two supporters and maintain their film structure integrity. The plurality of carbon nanotubes 12 are joined end-to-end substantially along the same direction and connected to each other by van der Waals attractive force therebetween, thereby forming the flexible and free-standing carbon nanotube film. A thickness of the carbon nanotube film 10 can be selected according to actual needs. In one embodiment, the thickness of the carbon nanotube film 10 ranges from about 100 nanometers to about 100 micrometers.

The carbon nanotube film 10 comprises a plurality of micro pores. The plurality of micro pores improves a penetration of the electrolyte, and an ability of the lithium-ion battery anode 100 to adsorb and remove lithium-ions; and the plurality of micro pores can be used to hold lithium-ions. Therefore, a volume of the lithium-ion battery anode 100 will not be significantly increased during use.

The plurality of carbon nanotubes 12 can be single-walled carbon nanotubes, double-walled carbon nanotubes, or multi-walled carbon nanotubes. A particle size of each of the plurality of carbon nanotube 12 can be in a range from about 1 nanometer to about 200 nanometers. In one embodiment, the particle size of each of the plurality of carbon nanotube is in a range from about 20 nanometers to about 30 nanometers. The plurality of carbon nanotubes 12 can be pure, meaning there are few or no impurities adhered on surface of the plurality of carbon nanotubes 12. In one embodiment, a length of each of the plurality of carbon nanotube 12 is longer than 300 micrometers.

Figure 3:
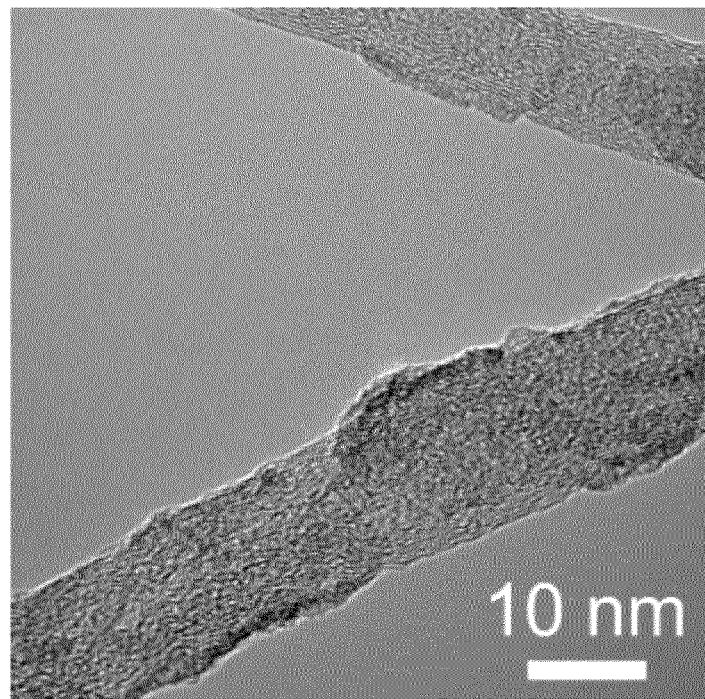
FIG. 3 is a scanning electron microscope image of one embodiment of a lithium-ion battery anode in which a plurality of titanium dioxide nanoparticles coat on a surface of a plurality of carbon nanotubes to form a continuous titanium dioxide layer.

The plurality of titanium dioxide nanoparticles 20 can be discontinuously dispersed on the surface of each of the plurality of carbon nanotubes 12. The plurality of titanium dioxide nanoparticles 20 can also continuously coat on the surface of each of the plurality of carbon nanotubes 12, to form a continuous titanium dioxide layer on the surface of each of the plurality of carbon nanotubes 12. Referring to FIG. 3, in one embodiment, the titanium dioxide nanoparticles 20 coat on the surface of each of the plurality of carbon nanotubes 12 to form a continuous titanium dioxide layer, and a core-shell structure is formed by the continuous titanium dioxide layer and the plurality of carbon nanotubes 12. If a thickness of the continuous titanium dioxide layer is too large, such as larger than 20 nanometers, the titanium dioxide nanoparticles 20 and the electrolyte can not be fully contacted, thus, an electrochemical performance of the lithium-ion battery anode 100 will be reduced; on the contrary, if the thickness of the continuous titanium dioxide layer is too small, such as smaller than 3 nanometers, an active material of the lithium-ion batteries is too less to result in poor lithium storage performance, a capacity of the lithium-ion battery will drop. In one embodiment, the thickness of the continuous titanium dioxide layer ranges from about 3 nanometers to about 20 nanometers. In another embodiment, the thickness of the continuous titanium dioxide layer is about 10 nanometers.

Figure 4:
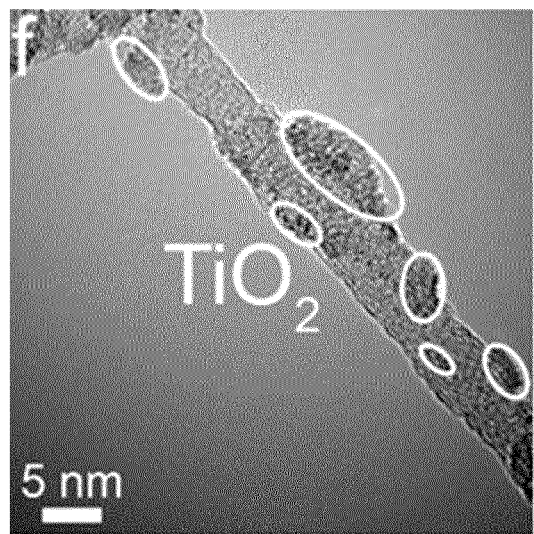
FIG. 4 is a scanning electron microscope image of one embodiment of a lithium-ion battery anode in which a plurality of titanium dioxide nanoparticles is uniformly dispersed on a surface of a plurality of carbon nanotubes.

Referring to FIG. 4, in one embodiment, the titanium dioxide nanoparticles 20 are uniformly dispersed on the surface of the plurality of carbon nanotubes 12, and the plurality of titanium dioxide nanoparticles 20 do not agglomerate on the surface of the plurality of carbon nanotube 12. Therefore, an electron shuttle distance is short, an ion transport speed and electron transport rate are high, the battery magnification is small, and the battery attenuation is slow. In one embodiment, a spacing between adjacent titanium dioxide nanoparticles of the plurality of titanium dioxide nanoparticles 20 is ranged from about 3 nanometers to about 20 nanometers. If the spacing between adjacent titanium dioxide nanoparticles 20 is too large, such as larger than 20 nanometers, the active material of the lithium-ion batteries is too less to result in poor lithium storage performance, and the capacity of the lithium-ion battery will drop; on the contrary, if the spacing between adjacent titanium dioxide nanoparticles 20 is too small, such as less than 3 nanometers, the titanium dioxide particles 20 will join together to form larger particles, the titanium dioxide nanoparticles 20 and the electrolyte can not be fully contacted, thus, the active sites will be reduced.

A mass percentage of the titanium dioxide nanoparticles 20 in the lithium-ion battery anode 100 can range from about 20% to about 60%. In such range, the lithium-ion battery using the lithium-ion battery anode 100 has small attenuation ratio and large capacity, and can achieve high rate ultrafast charge and discharge. If the mass percentage is too small, such as less than 20%, the active material of the lithium-ion batteries is too less to result in poor lithium storage performance, and the capacity of the lithium-ion battery will drop; on the contrary, if the mass percentage is too large, such as larger than 60%, the electron shuttle distance will be long, the battery magnification will be small, and the battery attenuation is fast. In one embodiment, the mass percentage of the titanium dioxide nanoparticles 20 in the lithium-ion battery anode 100 is about 28.7%.

A mass density of the titanium dioxide nanoparticles 20 can be ranged from about 1 $mg/cm^2$ to about 3 $mg/cm^2$. The mass density of the titanium dioxide nanoparticles 20 means a mass of the titanium dioxide nanoparticles 20 on one square centimeter of carbon nanotube surface. If the mass density is too small, such as less than 1 $mg/cm^2$, the active material of the lithium-ion batteries is too less to result in poor lithium storage performance, and the capacity of the lithium-ion battery will drop; on the contrary, if the mass density is too large, such as larger than 3 $mg/cm^2$, the electron shuttle distance will be long, the battery magnification will be small, and the battery attenuation will be fast. In one embodiment, the mass density of the titanium dioxide nanoparticles 20 is about 1.3 $mg/cm^2$.

The plurality of carbon nanotubes 12 of the carbon nanotube film 10 are pure, and the carbon nanotube film 10 has a large viscosity, thus, the titanium dioxide nanoparticles 20 can be absorbed on the carbon nanotube film 10 through physical force, such as a Ti—C noncovalent bonded interaction.

Example 1

In this example, the lithium-ion battery anode 100 is assembled in a first half cell, with pure lithium foils as a counter and reference electrode.

Comparative Example 1

In this comparative example, conventional lithium-ion battery anode is assembled in a second half cell, with pure lithium foils as a counter and reference electrode. The second half cell is the same as the first half cell in Example 1, except that the lithium-ion battery anode is different from the lithium-ion battery anode 100.

Figure 5:
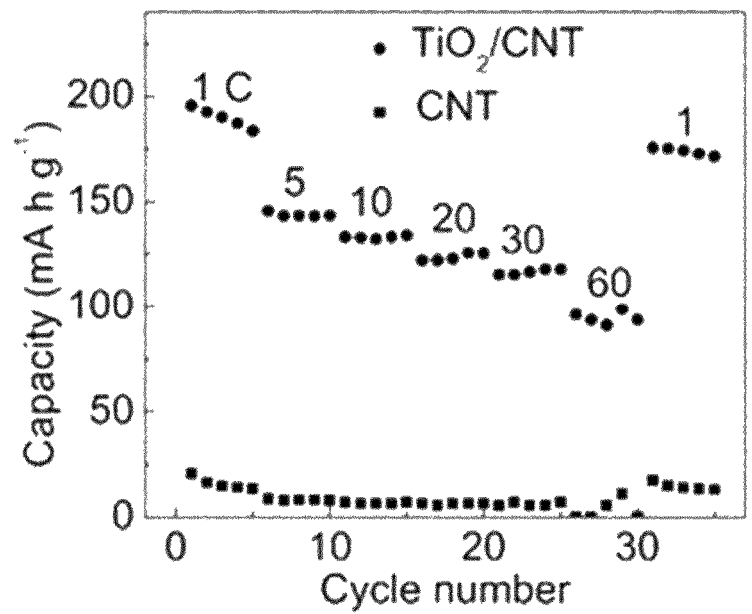
FIG. 5 is charge and discharge cycles curves at different rates of a lithium-ion battery anode of Example 1 and a lithium-ion battery anode of Comparative Example 1.

Referring to FIG. 5, when a cut-off voltage is in a range from about 1.0 V to about 3.0V, the first half cell of Example 1 is discharged at current densities of 1 C, 5 C, 10 C, 20 C, 30 C and 60 C, respectively. It can be seen that the first half cell demonstrate discharge capacities of 190 mA h $g^{-1}$, 145 mA h $g^{-1}$, 135 mA h $g^{-1}$, 125 mA h $g^{-1}$, 120 mA h $g^{-1}$, 100 mA h $g^{-1}$ at 1 C, 5 C, 10 C, 20 C, 30 C and 60 C, respectively; and the discharge capacity is still as high as 175 mA h $g^{-1}$ when the current density returns to 1 C. However, the discharge capacities of the second half cell at current densities of 1 C, 5 C, 10 C, 20 C, 30 C and 60 C are less than 25 mA h $g^{-1}$. Therefore, compared with conventional lithium-ion battery anode, the lithium-ion battery anode 100 has larger discharge capacity and smaller battery capacity decay ratio.

Figure 6:
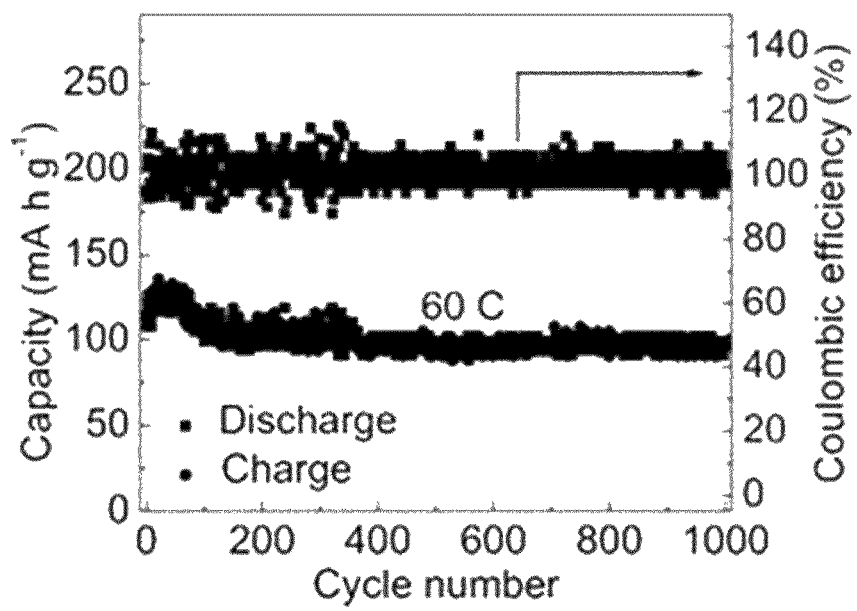
FIG. 6 is a constant current charge-discharge curve of one embodiment of a lithium-ion battery anode.
Figure 7:
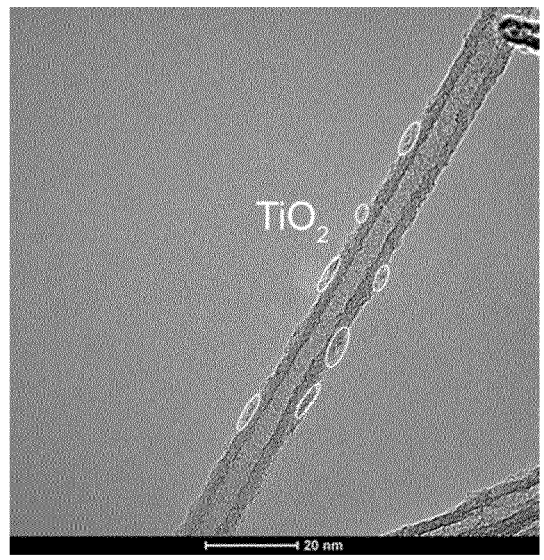
FIG. 7 is a scanning electron microscope image of one embodiment of a lithium-ion battery anode after charged and discharged 1000 times at a constant rate of 60 C.

Referring to FIG. 6, the first half cell of Example 1 is charged and discharged at a constant rate of 60 C, after a charge/discharge cycle is performed 1000 times, a capacity of the lithium-sulfur battery of Example 1 is about 100 mA h $g^{-1}$, a capacity retention ratio of the first half cell in Example 1 is larger than 95%, and a coulomb efficiency of each charge and discharge cycle is close to 100%. It can be seen that the capacity retention ratio and the capacity of the lithium-ion battery anode 100 are high. Referring to FIG. 7, in one embodiment, after the lithium-ion battery anode 100 is charged/discharged 1000 times at a constant rate of 60 C, a structure of the lithium-ion battery anode 100 is substantially unchanged.

The lithium-ion battery anode 100 can have many advantages. First, the lithium-ion battery anode 100 has flexibility and free-standing property, and can be bent freely; and the particle size of each of the plurality of titanium dioxide nanoparticles 20 is small, which let the lithium-ion battery anode 100 has high capacities even at very high charge/discharge rates. Second, the lithium-ion battery anode 100 without any binders, conductive additives and current collectors, thus, under the same specific capacity and total capacity, the lithium-ion battery using the lithium-ion battery anode 100 has a smaller mass; there are not insulation materials between the titanium dioxide nanoparticles 20, thus, the conductivity of the lithium-ion battery anode 100 is increased; and the conductivity of the lithium-ion battery anode 100 is more environmentally friendly. Third, the carbon nanotube film 10 comprises a plurality of micro pores, the plurality of micro pores improves a penetration of the electrolyte and an ability of the lithium-ion battery anode 100 to adsorb and remove lithium-ions, and the plurality of micro pores can be used to hold lithium-ions, therefore, a volume of the lithium-ion battery anode 100 will not be significantly increased during use.

Figure 8:
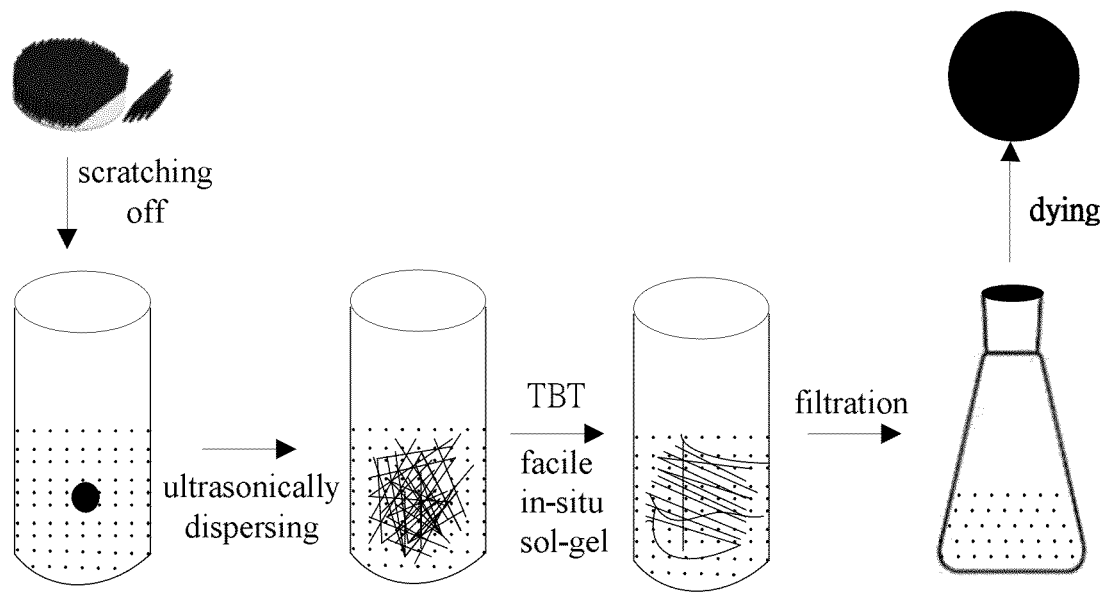
FIG. 8 is a flow chart of one embodiment of making a lithium-ion battery anode.
Figure 9:
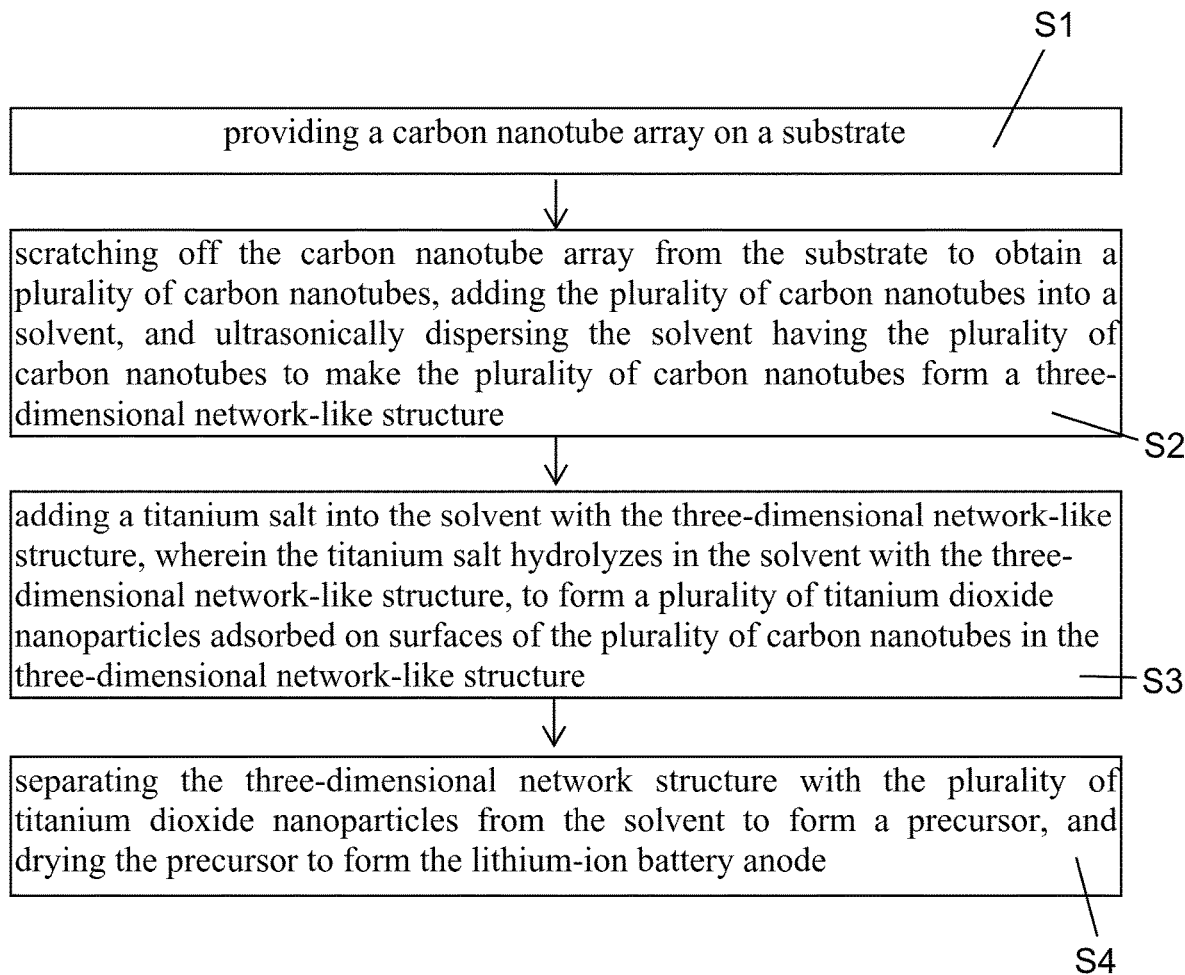
FIG. 9 is a flow chart of one embodiment of making a lithium-ion battery anode.

Referring to FIG. 8 and FIG. 9, an embodiment is described in relation to a first method for making the lithium-ion battery anode 100. The first method embodiment comprises at least the following, general steps:

step (S1), providing a carbon nanotube array on a substrate, a solvent and a titanium salt;

step (S2), scratching off the carbon nanotube array from the substrate to obtain a plurality of carbon nanotubes, adding the plurality of carbon nanotubes into the solvent, and ultrasonically dispersing the solvent having the plurality of carbon nanotubes to make the plurality of carbon nanotubes form a three-dimensional network-like structure;

step (S3), adding the titanium salt into the solvent with the three-dimensional network-like structure, wherein the titanium salt hydrolyzes to form a plurality of titanium dioxide particles, and the plurality of titanium dioxide particles are adsorbed on surfaces of the plurality of carbon nanotubes in the three-dimensional network-like structure; and step (S4), separating the nanotube three-dimensional network structure adsorbed with the plurality of titanium dioxide nanoparticles from the solvent to form a precursor, and drying the precursor to form a titanium dioxide-carbon nanotube composite film, wherein the titanium dioxide-carbon nanotube composite film is the lithium-ion battery anode.

In more detail, in step (S1), the carbon nanotubes in the carbon nanotube array can be orderly or disorderly arranged. The term 'orderly arranged' refers to the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The term 'disorderly arranged' refers to the carbon nanotubes are arranged along different directions, and the aligning directions of the carbon nanotubes are random. In one embodiment, the carbon nanotube array is a super-aligned carbon nanotube array. A length of the carbon nanotubes in the super-aligned carbon nanotube array is long, such as larger than 300 micrometers. The carbon nanotubes in the super-aligned carbon nanotube array are pure, meaning there are few or no impurities adhered on surface of the carbon nanotubes. The carbon nanotubes in the super-aligned carbon nanotube array are arranged along the same direction.

A method for making the super-aligned carbon nanotube array can be chemical vapor deposition, arc discharge preparation method, or Aerosol preparation method. In one embodiment, the method for making the super-aligned carbon nanotube array is chemical vapor deposition.

The solvent should have excellent wettability to the carbon nanotubes. The solvent can be ethanol, methanol, acetone, isopropanol, dichloroethane, chloroform, or the like. In one embodiment, the solvent is ethanol, and the ethanol is placed in a wide mouth container, such as a beaker.

Titanium salt is used for hydrolytic reaction to generate the plurality of titanium dioxide nanoparticles. The titanium salt can be butyl titanate, titanium tetrafluoride ($TiF_4$), titanium tetrachloride ($TiFCl_4$), titanium isopropoxide (Ti{OCH(CH3)2}4), or titanyl sulfate (TiOSO$_4$). In one embodiment, the titanium salt is tetrabutyl titanate (TBT).

In more detail, in step (S2), in one embodiment, the carbon nanotube array is located on a substrate, and the carbon nanotube array can be scratched off from the substrate by a tool, such as a blade.

A time of ultrasonically dispersing the solvent having the plurality of carbon nanotubes can be selected according to actual needs, such as, a size of the carbon nanotube array and a power of the ultrasound dispersion. The three-dimensional network-like structure is a flocculent structure. The carbon nanotubes in the flocculent structure are entangled with each other and uniformly distributed. The flocculent structure is a porous fluffy structure, and a shape of the flocculent structure like a batt in the traditional textile industry. During a process of ultrasonically dispersing the solvent having the plurality of carbon nanotubes, a power of ultrasonic waves can be in a range from about 400 W to about 1500 W. In some embodiments, the power of ultrasonic waves is in a range from about 800 W to about 1000 W. In one embodiment, the power of ultrasonic waves is about 900 W, and the time is about thirty minutes.

In one embodiment, in more detail, step (S3) further comprises adding an alkaline solution, water or an acidic solution into the solvent with the three-dimensional network-like structure. The alkaline solution can be ammonia water. The acidic solution can be dilute sulfuric acid, dilute hydrochloric acid, acetic acid or the like.

Hydrolyzed titanium salt can be quantified, for example, by the following two methods.

One method comprises adding the alkaline solution, water or acidic solution into the solvent with the three-dimensional network-like structure first, then adding the titanium salt into the solvent with the three-dimensional network-like structure, wherein an amount of the titanium salts exceeds an amount of the alkaline solutions, water or acidic solutions. With this method, the greater the amount of alkaline solution, water or acidic solution, the greater the amount of titanium dioxide nanoparticles are formed.

Another method comprises adding quantitative titanium salt into the solvent with the three-dimensional network-like structure first, then adding excess alkaline solution, water, or acidic solution into the solvent with the three-dimensional network-like structure. "Excess" means that one of the reactants is in relative excess in a trimmed chemical reaction equation; there is still some residual reactant after a complete reaction according to the proportional relationship in the trimmed chemical reaction equation. An amount of alkaline solution, water, or acidic solution exceeds an amount of the quantitative titanium salt.

A size of each of the titanium dioxide nanoparticles can be controlled by the amount of the titanium salt, the alkaline solution, the water or the acid solution, and a reaction time. The size of each of the plurality of titanium dioxide nanoparticles is less than or equal to thirty nanometers. In one embodiment, the size of each of the plurality of titanium dioxide nanoparticles is larger than or equal to three nanometers and less than or equal to twenty nanometers. In another embodiment, the hydrolyzed titanium salt is quantified by the first method, wherein a amount of the tetrabutyl titanate is 2.0 ml, a amount of the ammonia ranges from about 0.6 mL to about 1.4 mL, and the reaction time ranges from about one hour to about eight hours; and the size of each of the plurality of titanium dioxide nanoparticles is larger than or equal to three nanometers and less than or equal to ten nanometers.

In more detail, in step (S4), after adding the titanium salt into the solvent with the three-dimensional network-like structure, the titanium salt hydrolyzes to form a plurality of titanium dioxide particles, and the plurality of titanium dioxide particles are adsorbed on surfaces of the plurality of carbon nanotubes in the three-dimensional network-like structure to form a mixture. The mixture consists of the three-dimensional network-like structure and the plurality of titanium dioxide particles. The solvent with the mixture is kept static or centrifuged for some time, such as 1~20 minutes; the mixture will deposit to a bottom of the solvent, the solvent can be absorbed out from a container by a pipe, thereby separating the mixture from the solvent. The mixture can also be separated from the solvent by filtration, for example, vacuum filtration or atmospheric filtration.

After the nanotube three-dimensional network structure adsorbed with the plurality of titanium dioxide nanoparticles are separated from the solvent, the nanotube three-dimensional network structure adsorbed with the plurality of titanium dioxide nanoparticles can be dried at a room temperature or at a temperature from about 30 centigrade to about 80 centigrade. After the nanotube three-dimensional network structure adsorbed with the plurality of titanium dioxide nanoparticles is dried, the titanium dioxide-carbon nanotube composite film, the titanium dioxide-carbon nanotube composite film can be cut directly to form the lithium-ion battery anode. In other embodiments, the titanium dioxide-carbon nanotube composite film can be pressed and then cut to form the lithium-ion battery anode.

Figure 10:
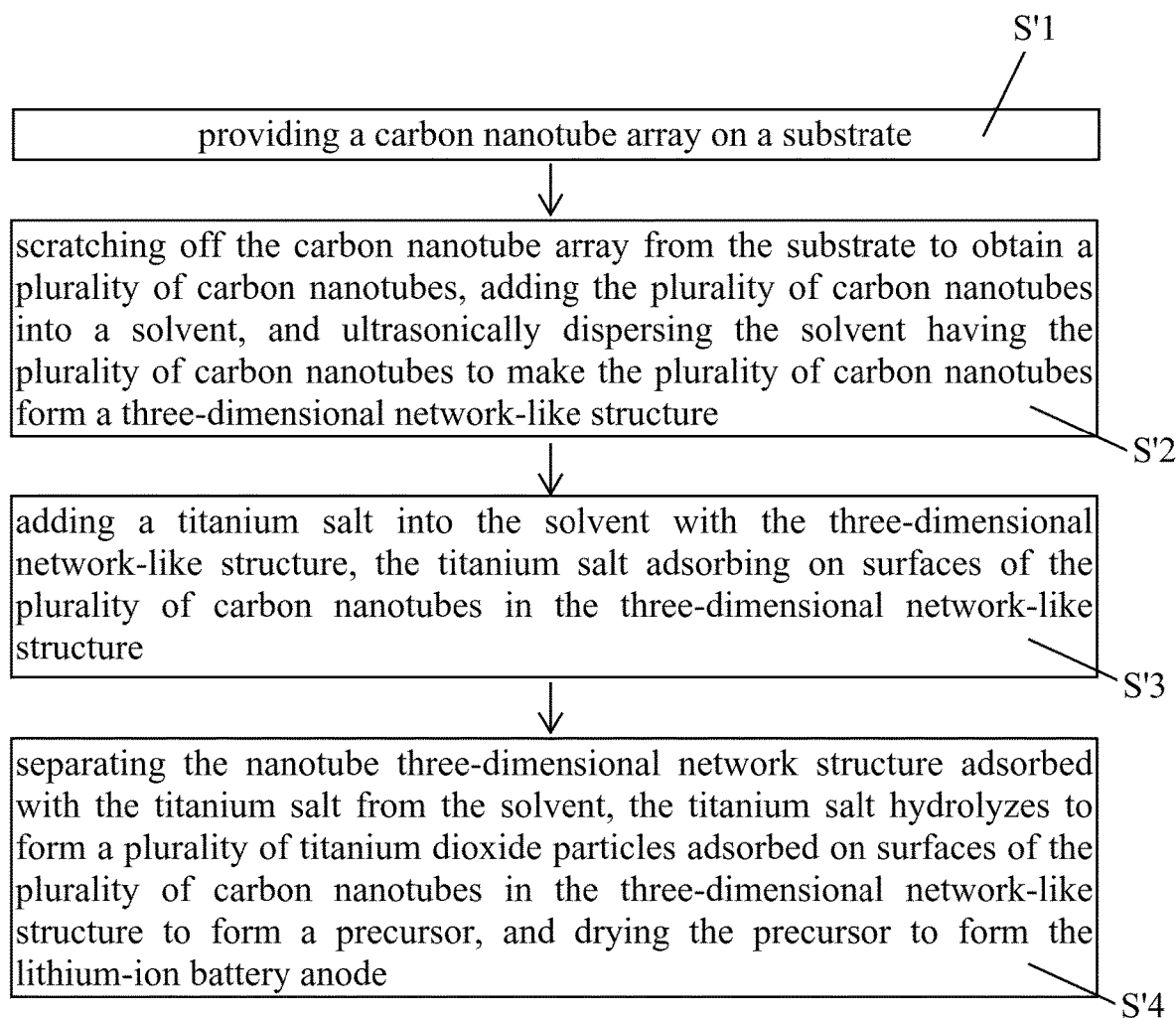
FIG. 10 is a flow chart of one embodiment of making a lithium-ion battery anode.

Referring to FIG. 10, One embodiment is described in relation to a second method for making the lithium-ion battery anode 100. The second method comprises at least the following general steps:

step (S'1), providing a carbon nanotube array on a substrate, a solvent and a titanium salt;

step (S'2), scratching off the carbon nanotube array from the substrate to obtain a plurality of carbon nanotubes, adding the plurality of carbon nanotubes into the solvent, and ultrasonically dispersing the solvent having the plurality of carbon nanotubes to make the plurality of carbon nanotubes form a three-dimensional network-like structure;

step (S'3), adding the titanium salt into the solvent with the three-dimensional network-like structure, and the three-dimensional network-like structure, and the titanium salt are adsorbed on surfaces of the plurality of carbon nanotubes in the three-dimensional network-like structure; and step (S'4), separating the nanotube three-dimensional network structure adsorbed with the titanium salt from the solvent, the titanium salt hydrolyzes to form a plurality of titanium dioxide particles, and the plurality of titanium dioxide particles are adsorbed on surfaces of the plurality of carbon nanotubes in the three-dimensional network-like structure to form a precursor, and drying the precursor to form a titanium dioxide-carbon nanotube composite film.

The second method is similar to the first method, except that the titanium salt is not hydrolyzed in step (S'3); the titanium salt hydrolyzes during or after a process of separating the nanotube three-dimensional network structure adsorbed with the titanium salt from the solvent in step (S'4). The titanium salt can be hydrolyzed directly in the air. The titanium salt can also be hydrolyzed by adding an alkaline solution, water or an acidic solution.

The first method and the second method for making the lithium-ion battery anode 100 can have many advantages. First, the lithium-ion battery anode is prepared using a facile in-situ sol-gel method, such method can be carried out at room temperature, and thus, the method is simple and easy. Second, the surface of the carbon nanotubes is not modified by strong acids or surfactants during an implementation of the method, thus avoiding an introduction of impurities and damage to the carbon nanotubes. Third, the method does not need to add a binder, a conductive agent, and a current collector, thus, under the same specific capacity and total capacity, the lithium-ion battery using the lithium-ion battery anode obtained by the method has a smaller mass; there are not insulation materials between the titanium dioxide nanoparticles, thus, the conductivity of the lithium-ion battery anode is increased; and the conductivity of the lithium-ion battery anode is more environmentally friendly. Finally, the lithium-ion battery anode obtained by the method has good electrochemical performance without the binder, the conductive agent, and the current collector.

Figure 11:
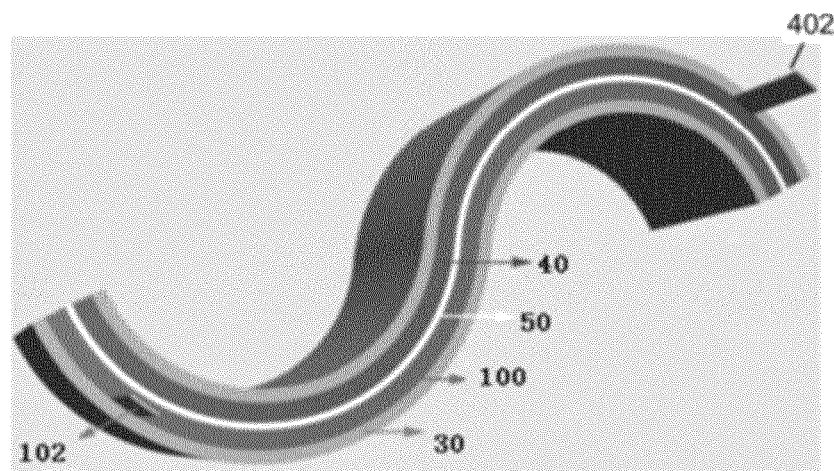
FIG. 11 is a structure schematic view of one embodiment of a flexible lithium-ion battery.

Referring to FIG. 11, one embodiment of a flexible lithium-ion battery 200 using the lithium-ion battery anode 100. The flexible lithium-ion battery 200 comprises an external encapsulating shell 30, a lithium-ion battery anode 100, a lithium-ion battery cathode 40, an electrolyte solution (not shown), and a separator 50. The lithium-ion battery cathode 40, the lithium-ion battery anode 100, and the separator 50 are encapsulated in the encapsulating shell 30. The electrolyte solution is filled in the encapsulating shell 30. The separator 50 is located between the lithium-ion battery cathode 40 and the lithium-ion battery anode 100. A cathode terminal 402 is electrically connected with the lithium-ion battery cathode 40. An anode terminal 102 is electrically connected with the lithium-ion battery anode 100. The flexible lithium-ion battery 200 is a flexible structure. The flexible lithium-ion battery 200 can be bent repeatedly without affecting a performance of the flexible lithium-ion battery 200.

The lithium-ion battery cathode 40 can be a composite film comprising a plurality of cathode active material particles and a plurality of carbon nanotubes. The composite film is flexible and free-standing. The plurality of carbon nanotubes are entangled with each other to form a porous film structure. The plurality of cathode active material particles are wrapped by the plurality of carbon nanotubes or attached on the surface of the plurality of carbon nanotubes. Therefore, the plurality of carbon nanotubes can act as a conductive agent and play a role in fixing the plurality of cathode active material particles. In one embodiment, the composite film consists of the plurality of cathode active material particles and the plurality of carbon nanotubes.

A material of the plurality of cathode active material particles can be lithium iron phosphate (e.g., $LiFePO_4$), lithium nickel cobalt oxide (e.g., $LiNi_{0.8}Co_{0.2}O_2$), lithium nickel cobalt manganese oxide (e.g., $LiNi_{1/3}Co_{1/3}Mn_{1/3}O_2$), lithium cobalt oxide (e.g., $LiCoO_2$), lithium manganese oxide (e.g., $LiMn_2O_4$) or any combination thereof. A shape of each of the plurality of cathode active material particles is not limited, and can be irregular or regular. A particle size of each of the plurality of cathode active material particles can be in a range from about 5 micrometers to about 20 micrometers. In one embodiment, the material of the plurality of cathode active material particles is $LiMn_2O_4$, and the particle size of each of the plurality of cathode active material particles is about 10 micrometers.

The plurality of carbon nanotubes can be single-walled carbon nanotubes, double-walled carbon nanotubes, or multi-walled carbon nanotubes. A particle size of each of the plurality of carbon nanotube can be in a range from about 1 nanometers to about 200 nanometers. The plurality of carbon nanotubes can be pure, meaning there are few or no impurities adhered on surface of the plurality of carbon nanotubes. In one embodiment, a length of each of the plurality of carbon nanotube is longer than 300 micrometers, and the length of the plurality of carbon nanotube is equal.

A mass percentage of the plurality of cathode active material particles in the composite film range from about 90 wt % to about 99.9 wt %. In some embodiments, the mass percentage of the plurality of cathode active material particles in the composite film range from about 95 wt % to about 99.9 wt %.

A method for making the composite film comprising the plurality of cathode active material particles and the plurality of carbon nanotubes comprises at least the following steps:

step (M1): providing a carbon nanotube array, the plurality of cathode active material particles, and a solvent, wherein the carbon nanotube array is located on a substrate;

step (M2): scratching off the carbon nanotube array from the substrate into the solvent, dispersing the plurality of cathode active material particles into the solvent, and ultrasonically dispersing the solvent to make the plurality of cathode active material particles and the plurality of carbon nanotube form a mixture; and step (M3): separating the mixture from the solvent to form a precursor, and drying the precursor to form the composite film comprising the plurality of cathode active material particles and the plurality of carbon nanotubes.

The solvent is a non-aqueous solvent that can disperse the plurality of carbon nanotubes. The solvent can be ethanol, methanol, acetone, ethylene glycol, propanol, isopropanol, or the like. In one embodiment, the solvent is ethanol, and the ethanol is placed in a wide mouth container, such as a beaker.

In more detail, in step (M3), the solvent with the mixture is kept still or centrifuged for some time, such as 1~20 minutes; the mixture will deposit to a bottom of the solvent, the solvent can be absorbed out from a container by a pipe, thereby separating the mixture from the solvent. The mixture can also be separated from the solvent by kept still or centrifuged for some time, the mixture will deposit to a bottom of the solvent, the solvent can be absorbed out from a container by a pipe, thereby separating the mixture from the solvent. The mixture can also be separated from the solvent by filtration, for example, vacuum filtration or atmospheric filtration.

The composite film comprising the plurality of cathode active material particles and the plurality of carbon nanotubes can be cut directly to form the lithium-ion battery cathode. In other embodiments, the titanium dioxide-carbon nanotube composite film can be pressed and then cut to form the lithium-ion battery anode.

Example 3

In the flexible lithium-ion battery of this example, the separator is a Celgard 2400 microporous polypropylene film. The electrolytic solution is that 1 M LiPF6 is dissolved in a mixture of ethylene carbonate (EC), diethyl carbonate (DEC) and dimethyl carbonate (DMC). The plurality of cathode active material particles are lithium manganate particles, the size of each of the plurality of cathode active material particles is about 10 micrometers. A mass percentage of the plurality of cathode active material particles in the lithium-ion battery cathode is about 96 wt %. The particle size of each of the plurality of titanium dioxide nanoparticles is in a range from about three nanometers to about ten nanometers. The mass percentage of the titanium dioxide nanoparticles in the lithium-ion battery anode is about 28.7%. The mass density of the titanium dioxide nanoparticles is about 1.3 mg/cm$^2$.

The flexible lithium-ion battery in Example 3 is tested for battery performance at room temperature with a cut-off voltage in a range from 1.25 V to 3.0 V.

Figure 12:
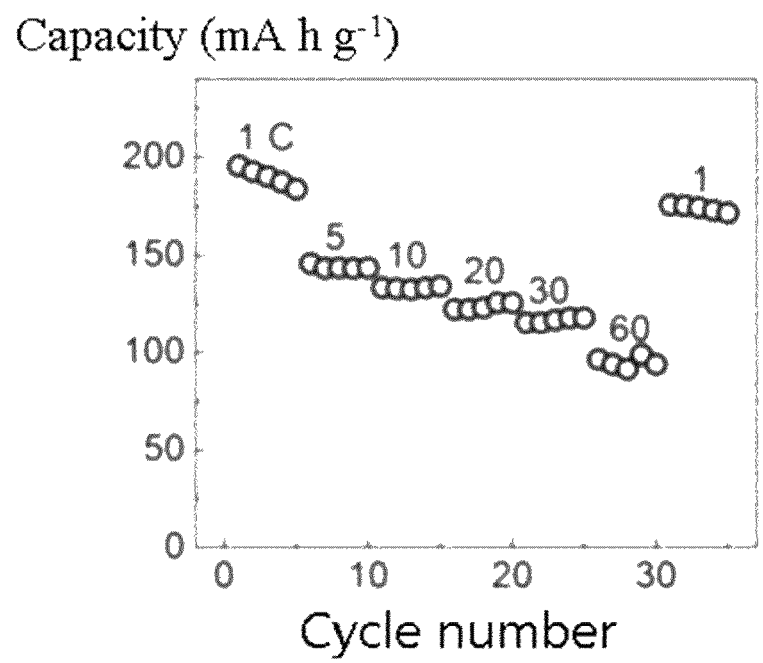
FIG. 12 is charge and discharge cycles curves at different rates of a flexible lithium-ion battery of Example 3.

Referring to FIG. 12, when a cut-off voltage is in a range from 1.25 V to 3.0 V, the flexible lithium-ion battery in Example 3 is discharged at current densities of 5 C, 10 C, 20 C, 30 C and 60 C, respectively. It can be seen that the flexible lithium-ion battery in Example 3 demonstrate discharge capacities of 150 mA h g$^{-1}$, 120 mA h g$^{-1}$, 95 mA h g$^1$, 80 mA h g$^{-1}$, 50 mA h g$^{-1}$ at 5 C, 10 C, 20 C, 30 C and 60 C, respectively. Therefore, the flexible lithium-ion battery in Example 3 has larger discharge capacity and smaller battery capacity decay ratio.

Figure 13:
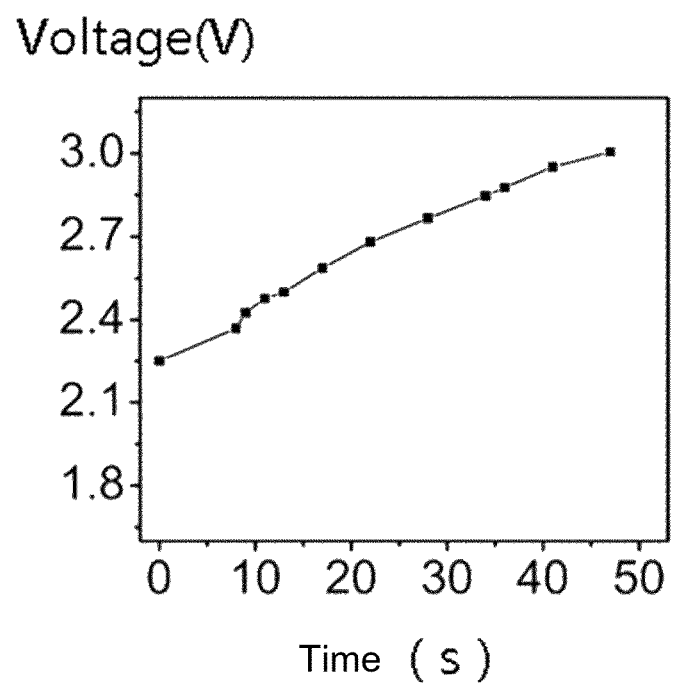
FIG. 13 is a fast charging curve of the flexible lithium-ion battery of Example 3.

Referring to FIG. 13, the flexible lithium-ion battery in Example 3 can be fully charged within 50 s, and an operating voltage of the flexible lithium-ion battery is in a range from about 1.25 V to about 3.0 V.

Figure 14:
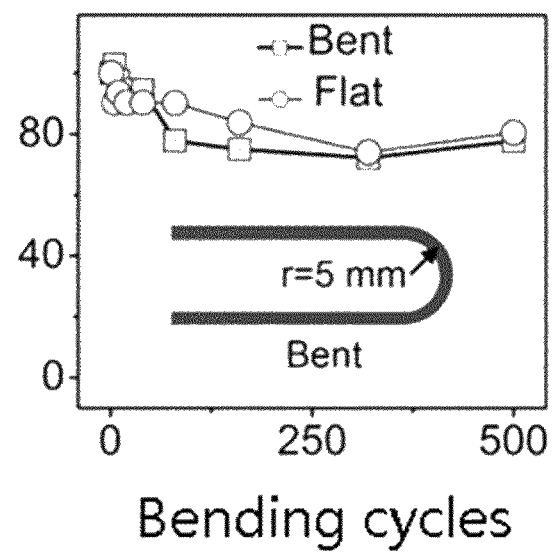
FIG. 14 is a comparison of capacity retention before and after bending of the flexible Li-ion battery of Example 3.

Referring to FIG. 14, a capacity decay of the flexible lithium-ion battery in Example 3 is almost negligible over 500 cycles of bending with a fast charging rate within 50 s, the capacity decay can reach above 80%. It can be seen that bending does not reduce the capacity of the flexible lithium-ion battery.

The flexible lithium-ion battery 200 can have many advantages. First, the flexible lithium-ion battery 200 has flexibility and free-standing property, and can be bent freely; and the particle size of each of the plurality of titanium dioxide nanoparticles 20 is small, which let the flexible lithium-ion battery 200 has high capacities even at very high charge/discharge rates. Second, the flexible lithium-ion battery 200 without any binders, conductive additives or current collectors, thus, under the same specific capacity and total capacity, the flexible lithium-ion battery 200 has a smaller mass; and the conductivity of the flexible lithium-ion battery 200 is higher. Third, the carbon nanotube film 10 comprises a plurality of micro pores, the plurality of micro pores improves a penetration of the electrolyte and an ability of the lithium-ion battery anode 100 to adsorb and remove lithium-ions, and the plurality of micro pores can be used to hold lithium-ions, therefore, a volume of the flexible lithium-ion battery 200 will not be significantly increased in the process of using the flexible lithium-ion battery 200.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A lithium-ion battery anode consisting of:
a flexible and free-standing carbon nanotube film comprising a plurality of carbon nanotubes, wherein a length of each of the plurality of carbon nanotube is longer than 300 micrometers, and the flexible and free-standing carbon nanotube film is a three-dimensional network-like structure; and
a plurality of titanium dioxide nanoparticles uniformly adsorbed on a surface of each of the plurality of carbon nanotubes through Ti—C noncovalent bonds, and discontinuously dispersed on the surface of each of the plurality of carbon nanotubes,
wherein a particle size of each of the plurality of titanium dioxide nanoparticles is less than or equal to 30 nanometers, a mass percentage of the titanium dioxide nanoparticles in the lithium-ion battery anode is in a range from about 20% to about 60%, and a mass density of the titanium dioxide nanoparticles is in a range from 1 mg/cm$^2$ to 3 mg/cm$^2$.

2. The lithium-ion battery anode of claim 1, wherein the particle size of each of the plurality of titanium dioxide nanoparticles is in a range from about 3 nanometers to about 20 nanometers.

3. The lithium-ion battery anode of claim 1, wherein the plurality of carbon nanotubes are pure carbon nanotubes free of impurities.

4. The lithium-ion battery anode of claim 1, wherein a spacing between adjacent titanium dioxide nanoparticles of the plurality of titanium dioxide nanoparticles is in a range from about 3 nanometers to about 20 nanometers.

5. A lithium-ion battery comprising:
a lithium-ion battery anode comprising:
a flexible and free-standing carbon nanotube film comprising a first plurality of carbon nanotubes, surfaces of the first plurality of carbon nanotubes not being modified, wherein a length of each of the first plurality of carbon nanotube is longer than 300 micrometers, and the flexible and free-standing carbon nanotube film is a three-dimensional network-like structure; and
a plurality of titanium dioxide nanoparticles uniformly adsorbed on a surface of each of the first plurality of carbon nanotubes through Ti—C noncovalent bonds, and discontinuously dispersed on the surface of each of the plurality of carbon nanotubes, wherein a particle size of each of the plurality of titanium dioxide nanoparticles is less than or equal to 30 nanometers, a mass percentage of the titanium dioxide nanoparticles in the lithium-ion battery anode is in a range from about 20% to about 60%, and a mass density of the titanium dioxide nanoparticles is in a range from 1 mg/cm$^2$ to 3 mg/cm$^2$;
a lithium-ion battery cathode;
a separator located between the lithium-ion battery cathode and the lithium-ion battery anode, and
an external encapsulating shell configured to encapsulate the lithium-ion battery cathode, the lithium-ion battery anode, and the separator; and
an electrolyte solution filled in the external encapsulating shell.

6. The lithium-ion battery of claim 5, wherein the lithium-ion battery cathode is a flexible and free-standing composite film comprising a plurality of cathode active material particles and a second plurality of carbon nanotubes.

7. The lithium-ion battery of claim 6, wherein the plurality of cathode active material particles are wrapped by the second plurality of carbon nanotubes or attached on the surface of the second plurality of carbon nanotubes.

8. The lithium-ion battery of claim 6, wherein a particle size of each of the plurality of cathode active material particles is in a range from about 5 micrometers to about 20 micrometers.

9. The lithium-ion battery of claim 6, wherein a mass percentage of the plurality of cathode active material particles in the flexible and free-standing composite film is in a range from about 90 wt % to about 99.9 wt %.

10. The lithium-ion battery of claim 5, wherein the particle size of each of the plurality of titanium dioxide nanoparticles is in a range from about 3 nanometers to about 20 nanometers.

11. The lithium-ion battery of claim 5, wherein the lithium-ion battery anode is free of binders, conductive additives and current collectors.

* * * * *